S. D. BUTTERWORTH.
WINDSHIELD VISOR.
APPLICATION FILED DEC. 31, 1920. RENEWED FEB. 20, 1922.
1,412,551.
Patented Apr. 11, 1922.
2 SHEETS—SHEET 2.
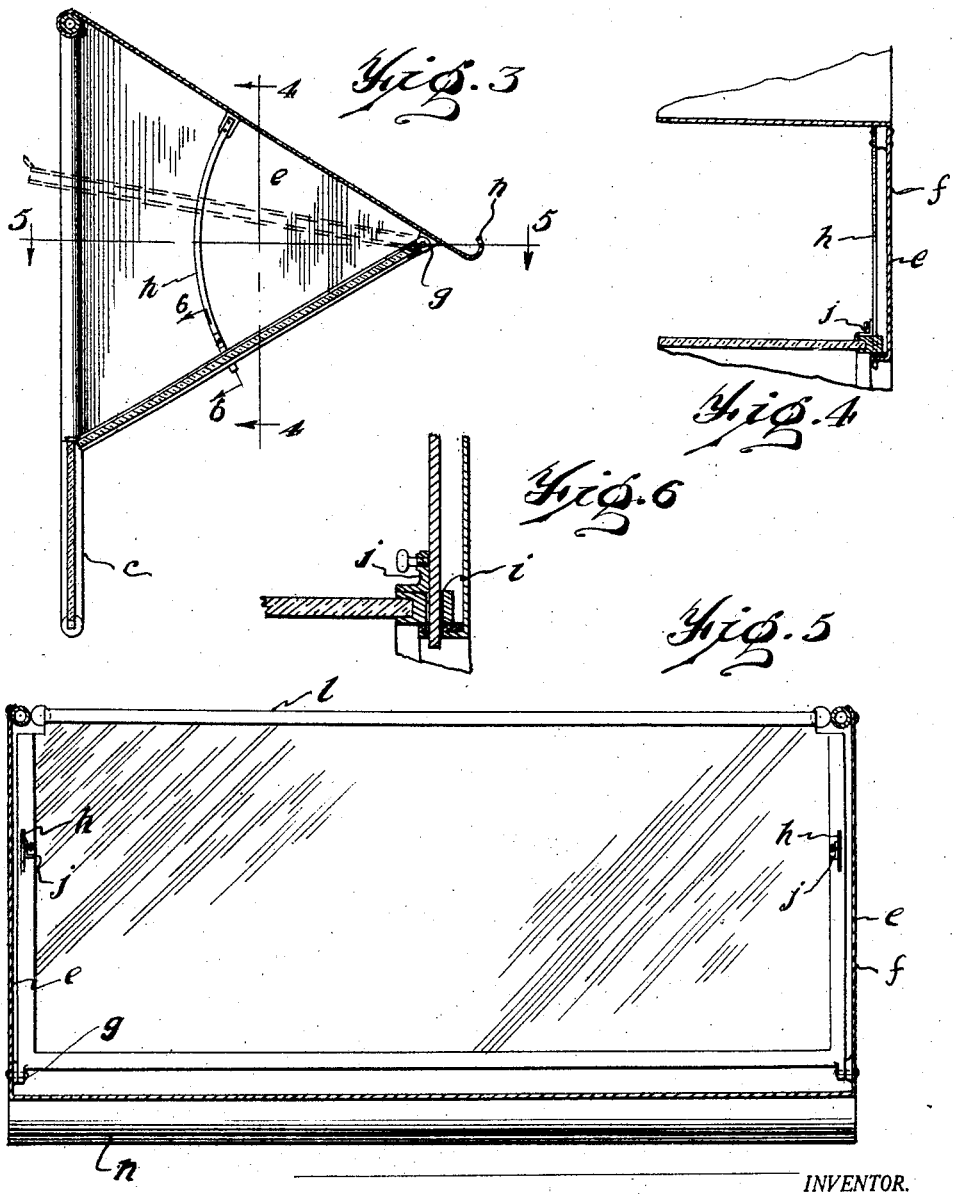
INVENTOR.
SAMUEL D. BUTTERWORTH
BY
ATTORNEY.

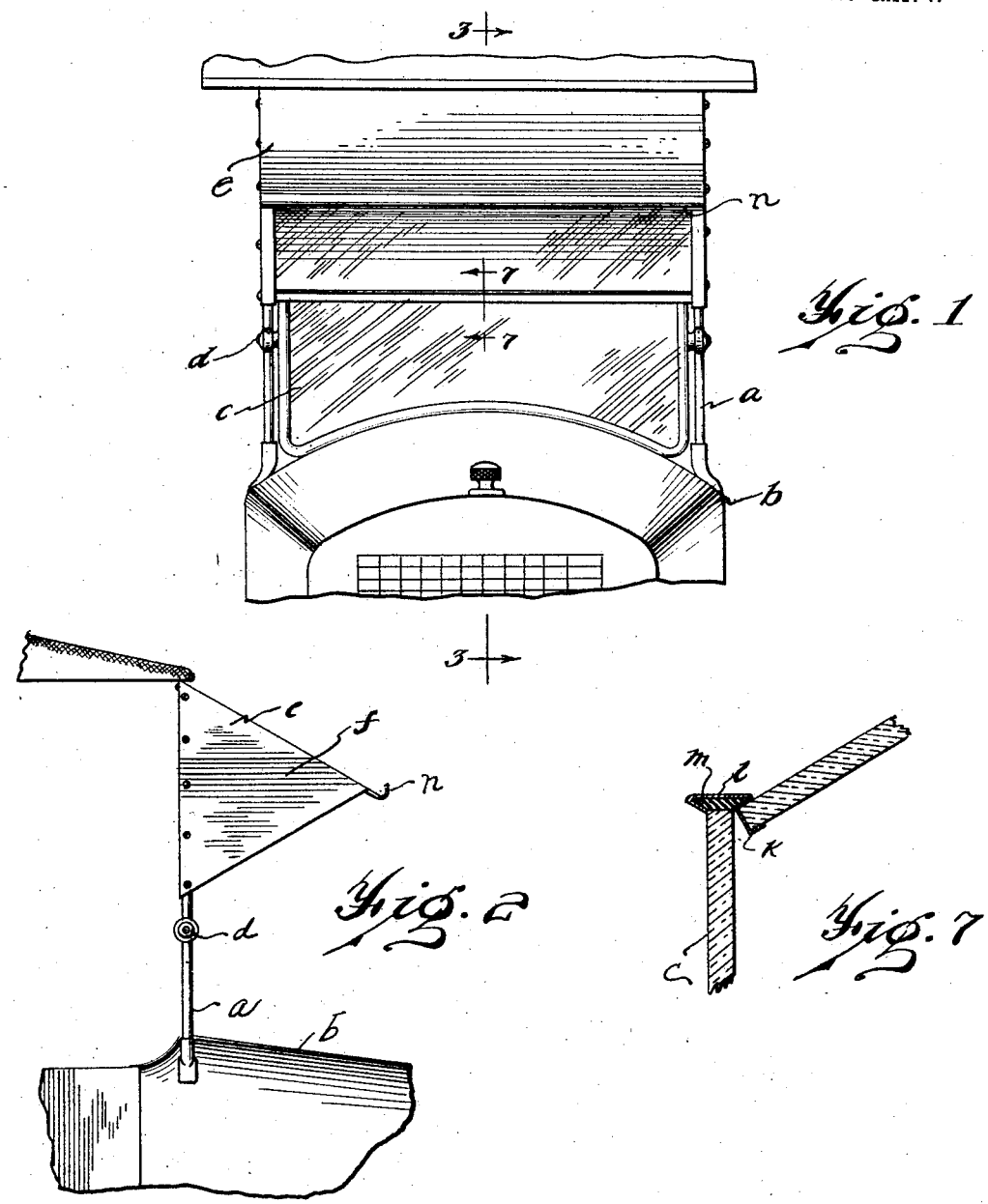

UNITED STATES PATENT OFFICE.

SAMUEL D. BUTTERWORTH, OF LANSING, MICHIGAN.

WINDSHIELD VISOR.

1,412,551. Specification of Letters Patent. Patented Apr. 11, 1922.

Application filed December 31, 1920, Serial No. 434,206. Renewed February 20, 1922. Serial No. 538,093.

*To all whom it may concern:*

Be it known that I, SAMUEL D. BUTTERWORTH, a citizen of the United States, residing at Lansing, in the county of Ingham and State of Michigan, have invented certain new and useful Improvements in Windshield Visors, of which the following is a specification.

This invention relates to windshield and visor constructions for the front of vehicles. It has for its object a design and arrangement of the windshield parts and the visor so as to eliminate the objectionable glare of artificial lights, and also to eliminate as far as possible the rain, mist and sleet annoyance that is present in almost every known type of windshield, including even those provided with the so-called rain vision shields.

The construction is adapted for both closed and open cars. It is here shown as used on an open car but would perhaps be more popular for closed cars.

In the drawings,—

Fig. 1 is a front elevation, fragmentary in character, of an automobile equipped with my combined windshield and visor construction.

Fig. 2 is a fragmentary view showing a side elevation of the same.

Fig. 3 is a cross section taken on the line 3—3 of Fig. 1.

Fig. 4 is a section taken on the line 4—4 of Fig. 3.

Fig. 5 is a section taken on the line 5—5 of Fig. 3.

Fig. 6 is an enlarged section showing the upper panel clamp and segment.

Fig. 7 is a section taken on the line 7—7 of Fig. 1.

The windshield posts are designated $a$ and are anchored in the cowl $b$ of the body. $c$ designates the lower windshield panel which is supported on the pivots $d$ of the windshield posts to swing for ventilating the driver's compartment. The lower panel is regular windshield construction. A sheet metal awning or visor $e$ is secured to the windshield posts and to the top connecting bar. This is provided not only with an inclined panel to act as a rain and sun shade but also with side plates $f$ to prevent the glare coming in at the sides and also for protecting the upper windshield panel from moisture, as will presently be described.

The upper windshield panel instead of being in vertical alignment with the lower windshield panel, as is the customary construction, is hinged to the inclined visor panel near its outer end, and may be supported in any suitable way, such as by pivots and lugs $g$. Segments $h$ are rigidly attached to the inclined visor panel and engage through slots $i$ in the side frames of the upper windshield panel. A clamp and set screw $j$ is mounted on the side frame of the upper panel and may clamp the upper windshield panel to any position of adjustment when swinging upon its pivots $g$, as will appear from Fig. 3. A weather strip $k$, comprising a sheet metal channel adapted to fit over the bottom of the upper windshield glass slab, and a second and offset dove-tailed channel $l$ to grip the rubber padding strip $m$, is used. This weather strip not only acts as a weather strip but it serves to rest the upper panel, as it were, on the top edge of the lower panel by the aid of a soft pad.

It will be noted that the visor panel slightly overhangs the line of pivoting of the upper windshield panel thereto and consequently serves as a protection against in-beating rain, wind, sleet and snow. Furthermore, and quite important, it will be seen that this upper windshield panel is turned up into a gutter $n$, which prevents water dropping or running down the panel from dropping off the edge and driving back upon the upper glass panel.

The arrangement of the upper panel in the fashion shown has many advantages. For ventilating purposes it will be found advantageous for the reason that it catches and directs the air downward and against the body of the user rather than up around his face and neck, where he is more susceptible to taking cold. The volume of incoming air can be nicely regulated by the clamp and segment and tilting of the panel. Furthermore, the position of the upper panel is decidedly more advantageous when rain, sleet or snow is met with. Any downwardly-inclined rain vision shield is supposed to keep a space on the upper panel clear from moisture. However, in actual use it has been found to have shortcomings in the average storm for the reason that the wind and the air rushing under the rain vision shield causes eddy currents which drive the moisture up onto the supposed protected area of the shield. With the top windshield panel inclined outwardly, as shown in Fig. 3, these eddy currents only strike the bottom of the top panel and consequently leave the upper portion of the top panel clear for an open view ahead.

The side plates of the visor protect the occupant of the car from air currents coming in from the sides and also make effective the clear vision through the upper windshield panel for the reason that moisture is not driven in at the sides so as to impair the dry area of this panel. These side plates have at their lower edges turned-in portions, as clearly shown in Fig. 6, adapted to act as side supports for the ends of the swinging glass panel.

I am aware that it is not broadly new to construct a windshield with a pair of panels adapted to have a V-like projection forward for the purpose of better vision in inclement weather. However, as far as I am aware, no one has previously built a permanent visor construction forward of the car and permanently hinged the upper panel thereto and provided it with suitable adjusting devices whereby the upper glass panel can be secured in any adjustment with respect to the permanent visor. This, as already explained, has many advantages over the old and common construction as a ventilating shield. Furthermore, it has the obvious advantage of a permanent sunshade and great utility in keeping the vision clear during stormy weather.

A further feature of positioning the upper shield in this way is that the upper and lower shield can be worked in co-operation so that by tipping them substantially parallel to each other they direct substantially only one air current downwardly into the driver's compartment, and on the other hand, they can be adjusted so that they direct two air currents in separately downward or horizontal directions.

What I claim is:

1. A combination visor and windshield construction, having in combination, a pair of windshield posts, a downwardly and forwardly-inclined permanently-located visor panel, a glass panel pivoted at its forward edge on said visor and extending rearwardly and downwardly when in closed position, and means for holding the panel in various angular positions with respect to the permanent visor panel, comprising a member supported from the inside of the permanent visor panel, and a clamping member on the swinging glass panel adapted to engage with said member suspended from the permanent visor panel to hold the glass panel in various angular positions with respect to the permanent visor panel.

2. In a combined visor and windshield construction, the combination of a pair of windshield posts, a permanently-set downwardly and forwardly-inclined visor panel supported at the top of the windshield posts, said visor provided with rigid side panels having their under sides turned in to form a support, a glass panel pivoted at its front edge to the visor near its front edge and extending downwardly and rearwardly when in closed position and adapted to rest on said side supports, said panels arranged to swing in between the rigid side panels and means for holding the said glass in several inwardly swinging angular positions of adjustment toward and away from the said visor panel.

3. In a combined visor and windshield construction, the combination of a pair of windshield posts, a visor panel forwardly and downwardly inclined supported at the top of the windshield posts, a pair of rigid side plates between the side edges of the visor panel and the windshield posts, and a glass panel permanently pivoted at its forward edge to the forward edge of the visor panel and downwardly and rearwardly inclined when in closed position, the said glass panel being adapted to swing between the rigid side plates and provided with means for holding it in various angular positions of adjustment between the said side plates.

4. In a combined windshield and visor construction, the combination of a pair of windshield posts, a visor panel supported at the top of the windshield posts and downwardly and forwardly inclined, a glass panel pivotally supported at the forward edge of the visor panel and normally rearwardly and downwardly inclined but adapted to swing on its pivot, a normally vertical lower glass panel supported between the windshield posts, and a double channel strip, one channel of which fits the edge of the upper glass panel and the other offset channel of which confines a pad strip adapted to rest on the top edge of the lower windshield panel.

5. In a combined windshield and visor construction, the combination of a pair of windshield posts, a permanently set sheet metal visor panel supported at the top of the windshield posts and downwardly and forwardly inclined, a lower glass panel pivotally supported between the window posts and normally vertical when in closed position, an upper glass panel pivoted to the under side of the sheet metal panel near the forward edge of said visor panel and extending downwardly and rearwardly to meet the upper edge of the lower glass panel, means for supporting the upper glass panel independently of the lower glass panel, and means for permitting one panel edge to rest on the other panel edge and for sealing the opening therebetween.

In testimony whereof I affix my signature.

SAMUEL D. BUTTERWORTH.